(12) United States Patent
White et al.

(10) Patent No.: US 7,490,290 B2
(45) Date of Patent: Feb. 10, 2009

(54) SYSTEM AND METHOD FOR A LOOK AND FEEL DESIGNER WITH A SKIN EDITOR

(75) Inventors: Brian White, Boulder, CO (US); Skip Sauls, Boulder, CO (US)

(73) Assignee: BEA Systems, Inc., San Jose, CA (US)

( * ) Notice: Subject to any disclaimer, the term of this patent is extended or adjusted under 35 U.S.C. 154(b) by 441 days.

(21) Appl. No.: 11/046,351

(22) Filed: Jan. 28, 2005

(65) Prior Publication Data

US 2006/0174188 A1 Aug. 3, 2006

(51) Int. Cl.
*G06F 17/00* (2006.01)
(52) U.S. Cl. .................... 715/236; 715/248; 715/249
(58) Field of Classification Search ................ 715/513, 715/501.1, 523, 522, 236, 248, 249
See application file for complete search history.

(56) References Cited

U.S. PATENT DOCUMENTS

| | | | |
|---|---|---|---|
| 6,317,142 B1 | 11/2001 | Decoste et al. | |
| 6,957,394 B1 | 10/2005 | Fernandez et al. | |
| 7,028,262 B2 | 4/2006 | Estrada et al. | |
| 7,035,944 B2 | 4/2006 | Fletcher et al. | |
| 7,111,234 B2 | 9/2006 | Peck et al. | 715/517 |
| 7,134,073 B1* | 11/2006 | Fiedorowicz et al. | 715/513 |
| 7,143,344 B2 | 11/2006 | Parker et al. | |
| 2004/0133855 A1* | 7/2004 | Blair et al. | 715/517 |
| 2005/0268230 A1 | 12/2005 | Bales | |
| 2006/0010374 A1 | 1/2006 | Corrington et al. | |
| 2006/0059461 A1 | 3/2006 | Baker et al. | |
| 2006/0085745 A1* | 4/2006 | Anderson et al. | 715/530 |

OTHER PUBLICATIONS

Liorean, Viewstyle Bookmarklet, Aug. 21, 2003, http://liorean.web-graphics.com/bookmarklets/viewstyles-c.js.*
Nielsen, Jakob, "Web Style Sheets Home Page" Feb. 20, 2007 http://www.w3.org/Style/.*
Stylesheets Source Viewer, Output of Viewstyle Bookmarklet on "Web Style Sheet", Jun. 8, 2007.*
"Introduction to the DOM Inspector," http://www.brownhen.com/DI/ last modified Feb. 2, 2004.*
Stylesheets Source Viewer, Expanded Output of Viewstyle Bookmarklet on Web Style Sheets, Apr. 29, 2008.*
Pitts et al., "HTML Style Sheets Design Guide," The Coriolis Group, Nov. 1, 1997, Chapter 10, pp. 152-157.
Teague, J. C., DHTML and CSS for the World Wide Web, 2nd Edition: Visual QuickStart Guide, Safari Books Online, May 30, 2001, http://proquest.safaribooksonline.com/0201730847, Part 3, Adding CSS, 7 pages.

(Continued)

*Primary Examiner*—Stephen S Hong
*Assistant Examiner*—Adam M Queler
(74) *Attorney, Agent, or Firm*—Fliesler Meyer LLP

(57) ABSTRACT

The present invention relates to systems, methods, and computer readable media for editing the look and feel of web portal content. An editor enables a user to select a node in an HTML document and to view a list of style properties for the HTML document. The editor then presents a list of relevant style properties and an ability to edit the style properties. Additionally, style properties can be organized hierarchically, added, and removed.

24 Claims, 8 Drawing Sheets

OTHER PUBLICATIONS

Cooper, C., Building Websites with Plone: An in-depth and comprehensive guide to the Plone content management system, Safari Books Online, published Nov. 30, 2004, http://proquest.safaribooksonline.com/1904811027/ sectiond0e15649, Cascading Style Sheets, 6 pages.

* cited by examiner

| Style Hierarchy Panel | Style Description Panel | View Area | Document Structure Tab | Property Editor Panel |
|---|---|---|---|---|
| 405 | 410 | 415 | 420 | 425 |

Style Description

Style Info ─────────────────────

```
*.portlet-section-header
{
  color: rgb(51, 51, 153);
  border-style: dotted;
  font-size: 120%;
  font-weight: bold;
  padding: 2px 0px;
  border-width: 1px 0px;
}
```
— 605

From file:css/portlet.css
Referenced at node:[<P> attribute]
class=portlet-section-header

Inherited Styles ─────────────── — 610

| Style | Property | Value |
|---|---|---|
| *.bea-portal-body | font-family | Verdana, Ari... |
| *.bea-portal-window | border-style | solid |
| *.bea-portal-book-primary | font-size | small |
| *.bea-portal-book-primary | width | 100% |
| *.bea-portal-window-content | padding | 0px |
| *.bea-portal-window | border-width | 1px |
| *.bea-portal-layout-placehol... | vertical-align | top |
| *.bea-portal-window | border-color | rgb(51, 51, 1... |
| *.bea-portal-window | background-c... | rgb(255, 255... |
| *.bea-portal-window-content | margin | 4px |

SYSTEM AND METHOD FOR A LOOK AND FEEL DESIGNER WITH A SKIN EDITOR

CROSS-REFERENCE TO RELATED APPLICATION

This application is related to the following applications which are hereby incorporated by reference in their entirety.

U.S. patent application Ser. No. 11/046,117, entitled SYSTEM AND METHOD FOR A LOOK AND FEEL DESIGNER WITH A PAGE-VIEW INTERFACE, by Brian White, filed concurrently.

U.S. patent application Ser. No. 11/045,934, entitled SYSTEM AND METHOD FOR A LOOK AND FEEL DESIGNER WITH A STYLE SHEET EDITOR, by Brian White, filed concurrently.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the design of web content. The present invention relates more particularly to tools for creating files to represent web content.

BACKGROUND OF THE INVENTION

During the past five years, the use of web portals, which comprise pages or groups of pages that allow a user to access a large number of centrally accessible applications and content have become widespread. Web portals enable a content provider to deliver large amounts of content and applications that are configured for easy access and can be organized as per an individual user's preferences.

One of the more important challenges facing the developers of web portal products is the development of tools that provide easier approaches to designing and organizing web portal content. Particularly, there has been an interest in tools and forms of organization that enable sections of a portal to be developed independently, while still maintaining varying degrees of uniformity in style and presentation.

One response has been the development of tools such as Cascading Style Sheets (CSS), which enable configuration of style properties for varying levels of a portal hierarchy. These documents can each be associated with different levels of a portal hierarchy (e.g. portal, book, page) and provide information on how text, graphics, borders, page structures, etc. are processed and interpreted.

However, the tools available for interpreting and editing these hierarchical documents are very limited. Designers and administrators must often edit the text of these files directly. Additionally, the task of determining which hierarchical files affect a document can involve searching through multiple configurations. What is needed is an improved system for accessing and editing style documents that affect a presentation of a web portal.

BRIEF DESCRIPTION OF THE DRAWINGS

FIG. 6 illustrates a graphical user interface presenting style sheet information in accordance with one embodiment of the present invention.

DETAILED DESCRIPTION

The present invention relates to systems, methods, and computer readable media for editing the look and feel of web portal content. An editor enables a user to select a node in an HTML document and to view a list of style properties for the HTML document. The editor then presents a list of relevant style properties and an ability to edit the style properties. Additionally, style properties can be organized hierarchically, added, and removed.

Figure 1:
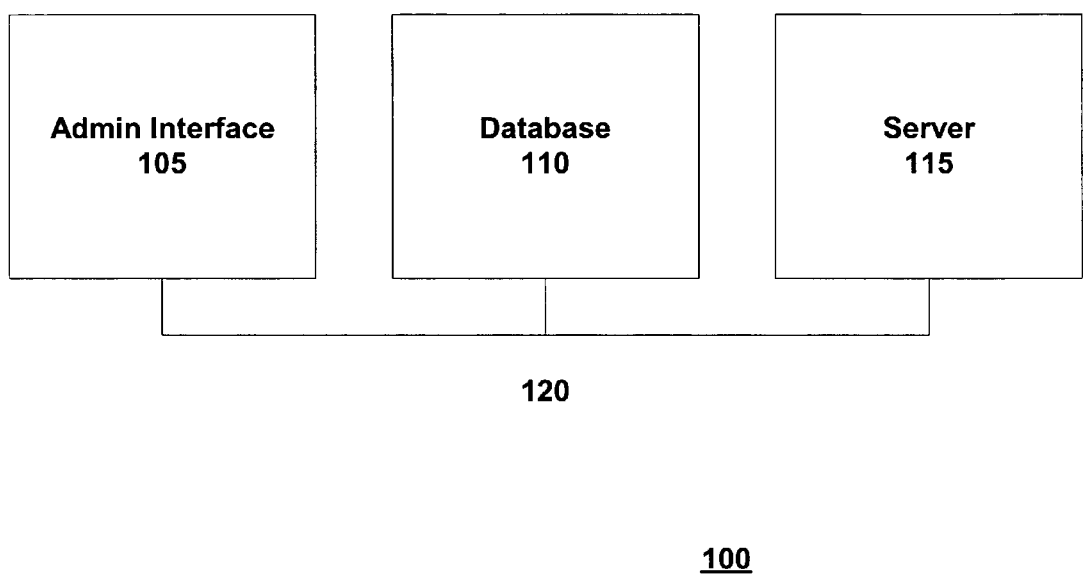
FIG. 1 illustrates one embodiment of a portal creation and administration system.

FIG. 1 illustrates one embodiment of a system 100 for portal creation and modification. The system includes an administrative and design user interface 105, one or more databases 110, and a server 115 connected through a network 120. The network 120 can include but is not limited to: public and/or private networks, wireless networks, optical networks, and satellite based communication links. Other suitable communication means can include but are not limited to: random access memory, file system(s), distributed objects, persistent storage, and inter-processor communication networks. The server 115 is a server that supports a web portal and various Java applications. In one embodiment, the server 115 utilizes WebLogic® Server, available from BEA Systems. The one or more databases 110 can include but is not limited to: relational databases, object-oriented databases, file systems, or any other kind of persistent storage. In one embodiment, the databases store portal content that is manipulated through the user interface 105 and accessed by the server 115 during its operation. The administrative interface 105 is an interface which can be remote or local to the server 115 that is used to configure, modify, and extend the server 115. The administrative interface can include any number of user interfaces, such as text interfaces, graphical interfaces, voice interfaces, or any other interface.

Figure 2:
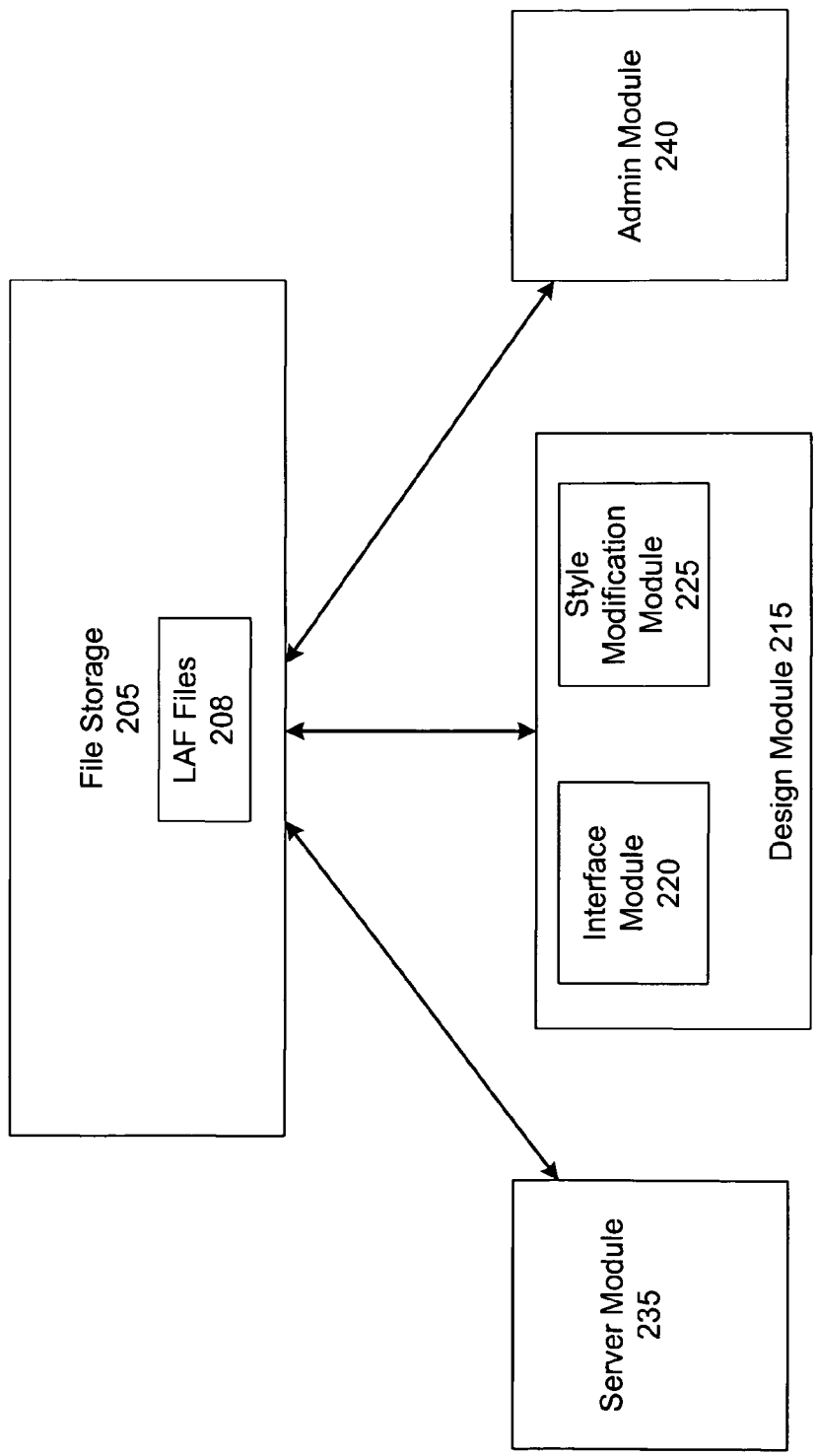
FIG. 2 illustrates a more detailed view of the interaction between a portal design system and portal content in accordance with one embodiment of the present invention.

FIG. 2 illustrates a more detailed view of the interaction between a portal design system and portal content. A file storage 205 interacts with a server module 235, a design module 215, and an admin module 240. In one embodiment, the server module 235 resides on the server 115 of FIG. 1, the admin module 240 and design module 215 reside in the administrative interface 105 of FIG. 1, and the file storage 205 resides in the one or more databases 110 of FIG. 1. While the arrangement above is disclosed, in alternate embodiments, any of these components can be distributed according to other arrangements.

The file storage contains files that are loaded by the server module 235 to serve the web portal to remote users accessing the server. The file storage stores one or more Look and Feel (LAF) files 208. LAF files are files containing the style and design elements for a portal. The LAF file includes skin files indicating color and presentation elements and skeleton files indicating shapes, structure and organization. While the style files are referred to as LAF files, in alternate embodiments, any terminology can be used. The LAF files are disclosed in greater detail with respect to FIG. 3.

The admin module 240 is used to administer the portal. The admin module can be used to modify user and resource permissions and page configurations. In some embodiments, the admin module 240 can be used to perform layout and design functions for the portal.

The design module 215 includes an interface module 220 and a style modification module 225. The interface module is configured to generate a user interface for accepting modifications to portal styles and to render portal styles so as to enable users to more easily modify portal style configuration. The style modification module 225 is configured to modify and create portal style files in response to user input received by the interface module. In one embodiment, the design module is WebLogic Workshop by BEA Systems of San Jose, Calif.

Figure 3:
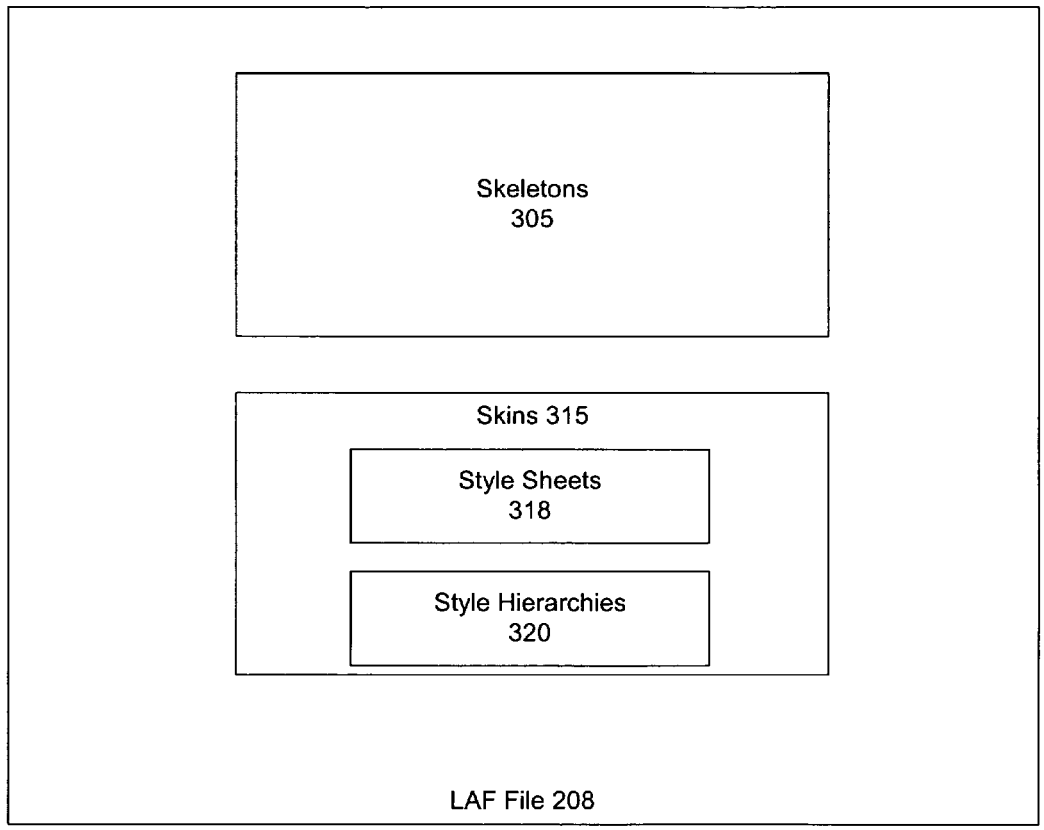
FIG. 3 illustrates a structure of a file containing portal design information in accordance with one embodiment of the present invention.

FIG. 3 illustrates a structure of a file containing portal design information in accordance with one embodiment of the present invention. The LAF file 208 includes skeletons 305 and skins 315. The skins include style sheets 318 and style hierarchies 320. While in the present embodiment, the skins 305 and skeletons 315 are represented as subsections of the LAF file, in alternate embodiments, other organizations can be employed. For example, in one embodiment the LAF file can include pointers to other, separate files containing portal design information.

In some embodiments the skeletons are stored separately and the LAF file 208 references the directory storing the skeletons 315. Every type of component, from a desktop to a portlet's title bar, can have an associated JSP (Java Server-Pages™) file, called a skeleton file, that renders it. For example, each desktop uses a skeleton file called shell.jsp that simply provides the opening and closing <HTML> (Hypertext Markup Language) tags to render the desktop. A portlet title bar, on the other hand, can have a skeleton file called titlebar.jsp that is more complex. It contains Java calls to various windowing methods in the API, references the button graphics to use on the title bar, and determines the placement of title bar elements with an HTML table definition.

The skin files 315 include the style sheets 318 and style hierarchies 320. The style sheets comprise groups of visual properties for displaying books/pages/portals, etc. The style sheets are often organized hierarchically, with certain style sheets applying to different subsets of a portal. For example, one style sheet might apply to all of the pages in a book, with separate style sheets for some of the pages.

The style hierarchies 320 indicate how the portal resolves conflicts for conflicting style sheets. For example the style sheet for a book might include parameters for a font to be used. However, the style sheet for a page within the book might specify a different font. Furthermore, a browser setting for a viewer of the page might specify a third font. The style hierarchies indicate how to resolve the various conflicts. In some embodiments, the individual style sheets include weights that are used to resolve the conflict.

In some embodiments, the style sheets and style hierarchies are stored together in Cascading Style Sheet (CSS) documents. Illustrated below is one example of a CSS document setting characteristics for the way text, backgrounds, graphics, and margins are set in a web page. The fields in this document could be used to set document design at varying levels within a hierarchy, such as for the entire portal, for a single book, or for a single page. The various subheadings in the CSS file refer to the page sections (e.g., body, unvisited links, visited links, headers) with the information in the subheadings indicating how fonts, text, graphics, should be presented.

```
/* basic elements */
body {
    font: 8pt/16pt georgia;
    color: #555753;
    background: #fff url(blossoms.jpg) no-repeat bottom right;
    margin: 0px;
}
p {
    font: 8pt/16pt georgia;
    margin-top: 0px;
    text-align: justify;
}
h3 {
    font: italic normal 12pt georgia;
    letter-spacing: 1px;
    margin-bottom: 0px;
    color: #7D775C;
}
a:link {
    font-weight: bold;
    text-decoration: none;
    color: #B7A5DF;
}
a:visited {
    font-weight: bold;
    text-decoration: none;
    color: #D4CDDC;
}
a:hover, a:active {
    text-decoration: underline;
    color: #9685BA;
}
```

While in the present embodiment, the values specified are particular values (e.g. particular colors, numerical spacing values) in alternate embodiments these values can be described relative to a value inherited from another style sheet. For example, a style sheet could specify that a font should be a certain percentage larger than a font value inherited from another style sheet.

Figure 4:
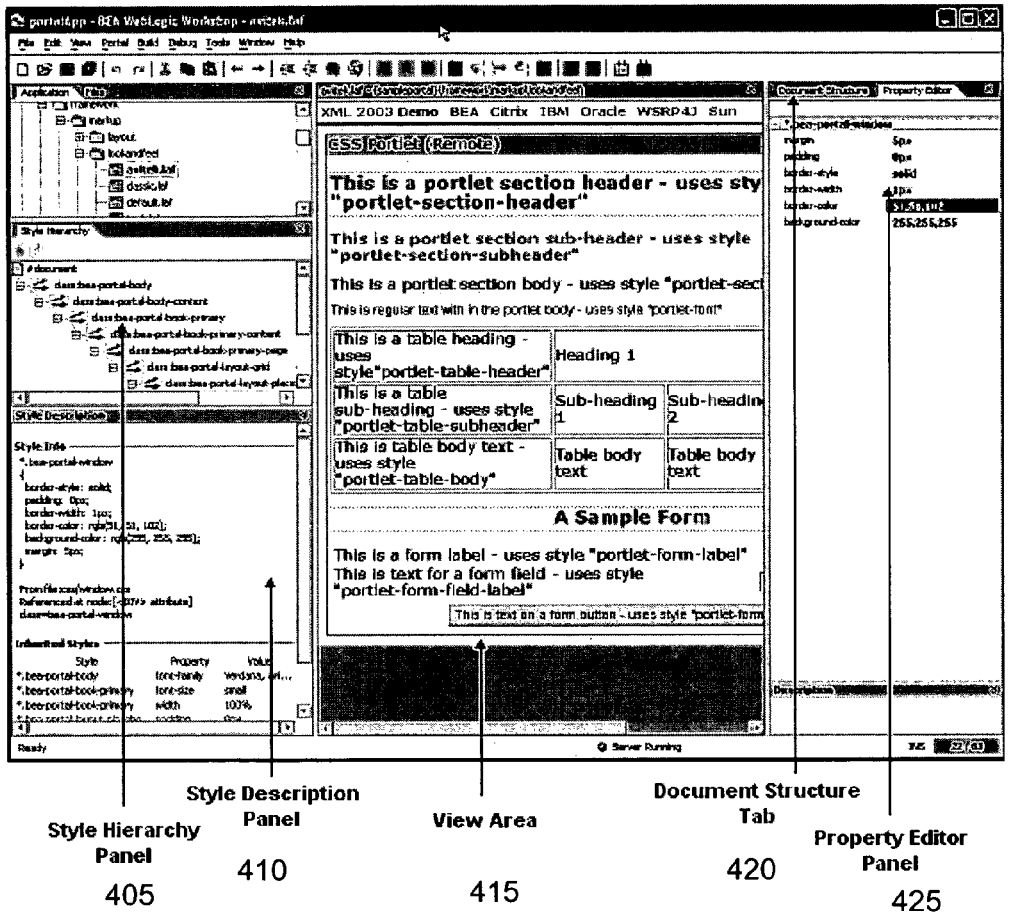
FIG. 4 illustrates a graphical user interface for editing portal style information in accordance with one embodiment of the present invention.

FIG. 4 illustrates a graphical user interface for editing portal style information in accordance with one embodiment of the present invention. The interface includes several open windows that are collectively accessible from a single main window. While in the present embodiment the windows are all open, in an alternate embodiment the windows and their associated functions can be accessed separately. The interface includes a style hierarchy panel 405 and style description panel 410, a primary viewing area 415, a document structure function 420, and a property editor panel 425.

The primary viewing area 415 renders an HTML document such as web page The interface can be configured to navigate to different pages through the use of graphical links or information submitted through a text window. In some embodiments, a user can select a section of an HTML document with a pointing indicator or some other interface element and the system will generate a list of style sheets that effect the section within the style hierarchy panel 405. This viewing area 415 is configured to enable a user editing a document's visual characteristics to see the effect of changes and to easily relate the way in which a document is presented to the associated configuration settings.

The style hierarchy panel 405 provides a list of style sheets that effect a particular HTML document or section of an HTML document. The style hierarchy panel can present the style hierarchy in response to a user selecting a location in the primary viewing area or in response to an address submitted directly. In the present embodiment, the style sheets are presented as an expandable tree with style sheets related to a particular element presented under the style sheets for the parent element. For example, style sheets for pages within a book could be represented under the style sheet for the book.

The style description panel 410 provides CSS style characteristics for selected styles. In one embodiment the window includes style characteristics for a style sheet selected within the style hierarchy panel 405. In an alternate embodiment, the style description panel 410 accepts a user-submission of a style name or enables a user to navigate to a style through a specialized menu. The style characteristics can be presented in the manner discussed in FIG. 3, with the style settings for various parts of an HTML document organized by section. The style description panel 410 also provides a list of inherited style sheets influencing the document. In one embodiment, the inherited styles are presented in a tabular format, with a list of inherited style sheets in a first column, the property inherited from the style sheet in a second column, and the inherited value of the property in the rightmost column. In one embodiment, a user can select a style from the inherited style section and cause the style characteristics for the style to be displayed.

The interface additionally includes a document structure function 420. The document structure 420 generates a list of the different sections of a particular HTML document and the style sheets governing said sections.

The property editor panel 425 accepts user initiated modifications of the style properties. The property editor panel displays a list of properties for a style sheet and their associated values. The modifications, if made, are saved to the style sheets 318 and are subsequently used to interpret how the HTML document should be viewed. In one embodiment, the property editor is linked to the style hierarchy panel and enables editing of styles selected within the style hierarchy panel. In an alternate embodiment, the panel enables a user to navigate to a style sheet.

While the present and subsequent figures discuss a graphical user interface in which selections are submitted using a keyboard or pointing indicator (e.g. mouse or trackball) in alternate embodiments selections can be made through any number of user interfaces such as touchscreens, voice interfaces, or any other mechanism.

Figure 5:
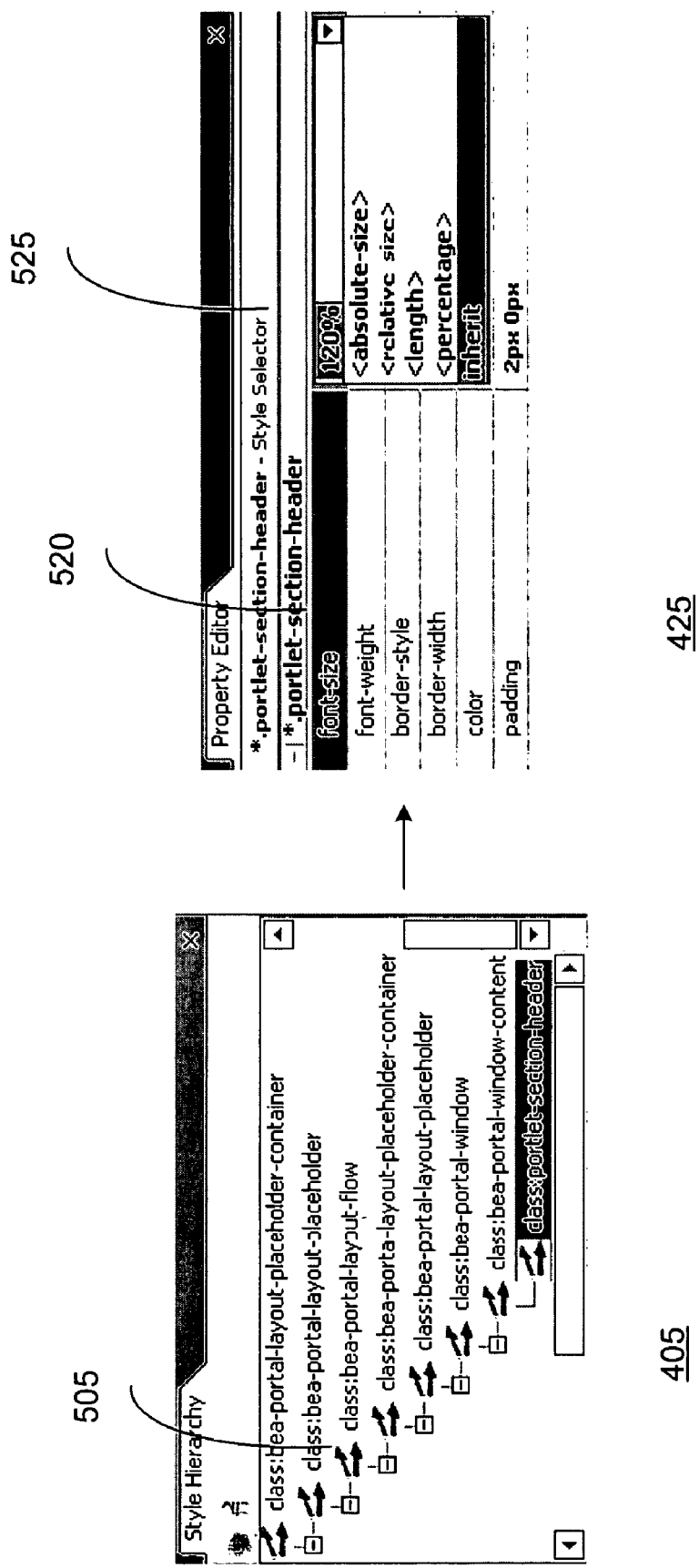
FIG. 5 illustrates a graphical user interface for accessing a style sheet hierarchy in accordance with one embodiment of the present invention.

FIG. 5 illustrates a graphical user interface for accessing a style sheet hierarchy in accordance with one embodiment of the present invention. Illustrated herein are the style hierarchy 405 and the property editor 425. In the present embodiment the two functions are used together to view and modify styles, but in alternate embodiments each can be employed separately.

In the present embodiment a CSS class is selected within the style hierarchy. The selection of the class causes the style properties for the class to appear within the property editor. While the present embodiment is constructed as a graphical user interface that accepts user selections and text submissions through a keyboard and a pointing indicator, it should be clear to those of ordinary skill in the art that any number of interfaces can be used.

Once a class is selected the features of the class, such as color, font type and size and other design elements can be modified by accessing the feature and replacing the existing setting with a new setting. In the present embodiment, style sheet for a portlet section header is being selected and a font size is being set to 120% of an inherited font size. When utilized within a document the style setting would cause section header text to be 20% larger than an inherited section header text value from a style sheet further up in the hierarchy.

In alternate embodiments, rather than presenting a menu of options for a property value, a text dialogue can be presented that enables a user to type or otherwise submit a custom value. When changes are made they are stored in the style sheets 318. In some embodiments, changes are stored automatically. In alternate embodiments, a user must select a "save" function to store changes.

FIG. 6 illustrates a graphical user interface presenting style sheet information in accordance with one embodiment of the present invention. A lower section 610 of the style window 410 provides a list of inherited styles for a page currently being viewed within the view area 415. For example, a window within a portal will have a number of inherited styles that are set on the portal and book levels. The inherited styles will typically include values inherited for a number of different properties such as font-size, border width, alignment, margins, border color, and any other set of properties that are supported. The upper window additionally includes the values for each of the inherited styles. In some embodiments, the style can be edited in the property editor by selecting the style 425 with a pointing indicator or other interface tool.

An upper window 605 displays the properties that are inherited from a particular style. In some embodiments, a style is displayed when selected from the bottom window 610. The upper window includes a title of the style, a list of properties configured in the style, a location within a viewed HTML document in which the style is referenced, and a CSS file in which the style is stored.

Figure 7:
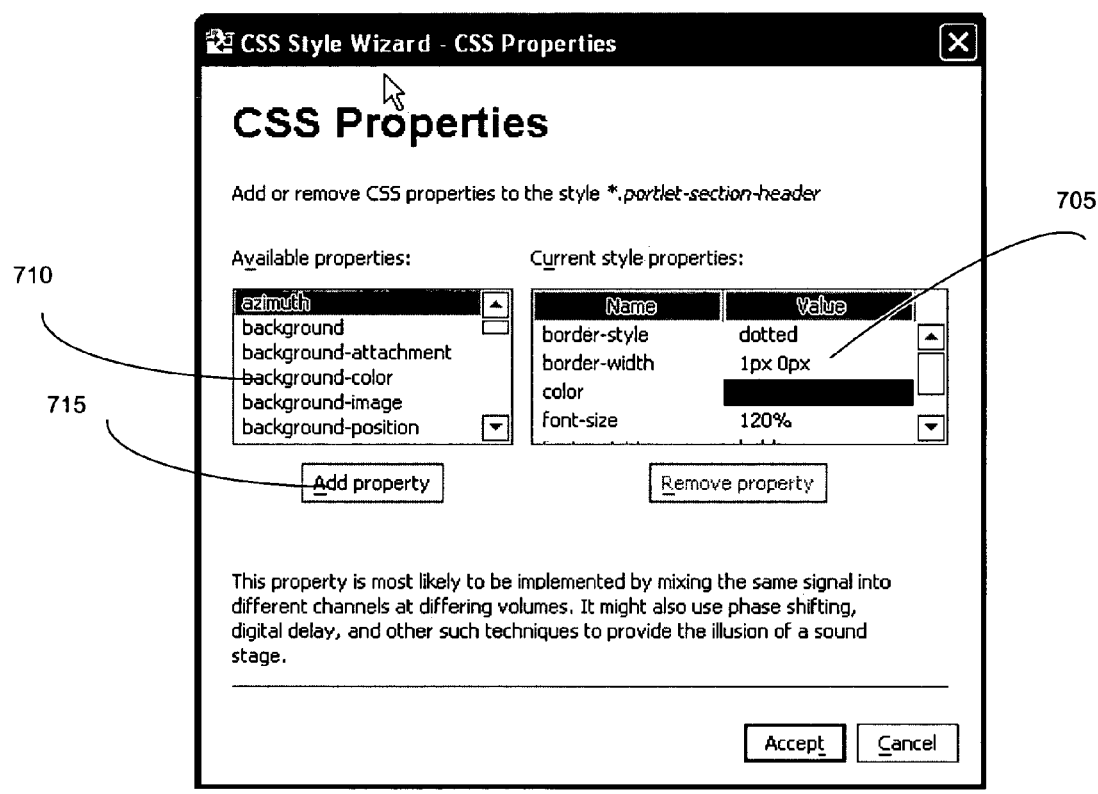
FIG. 7 illustrates a graphical user interface for modifying style sheet properties in accordance with one embodiment of the present invention.

FIG. 7 illustrates a graphical user interface for modifying style sheet properties in accordance with one embodiment of the present invention. The illustrated interface 700 enables a user to add an additional property to an existing style sheet. In some embodiments, this window is launched when a style sheet is selected from the style hierarchy window 405 or the property editor 425. In alternate embodiments, it can be launched from a menu item or icon. The interface includes a current properties window 705 that displays all properties currently defined in the style sheet.

The interface also includes an available properties window 710 that includes a list of properties that can be added to the style. When a property is selected, an "add property" button 715 can be used to add the property to the style sheet.

Once a property has been added, it appears in the window 705 listing current style properties 705. In some embodiments, the window 705 also includes a list of a available values for the property. Additionally, in some embodiments, a user can specify values for the newly added property by selecting it within the window, while in alternate embodiments, a separate editor can be used. When the properties are added, the changes can be saved to the style sheets 318.

Figure 8:
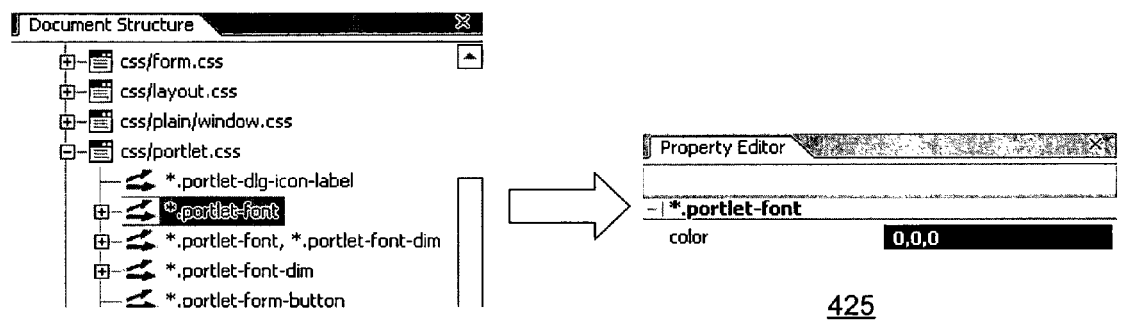
FIG. 8 illustrates a graphical user interface for viewing style sheets influencing a presentation of a document in accordance with one embodiment of the present invention.

FIG. 8 illustrates a graphical user interface for viewing and editing style sheets influencing a presentation of a document in accordance with one embodiment of the present invention. The interface 800 can be generated by selecting the document structure tab 420 from the main interface or launched independently. The interface 800 presents a list of all of the style sheets that affect the presentation of a document currently being viewed within the main interface 400. The style sheets may be CSS files or they may be some other format. In some embodiments, the system opens a skin file for the currently viewed document to determine the related style sheets. While the illustrated interface is organized hierarchically, other structures can be used. When an indicator next to a style sheet is selected, properties inherited from the style sheet can be viewed. Any number of style properties, such as border colors and sizes, font colors, spacing and sizes, or any other relevant properties can be viewed.

When a style sheet is selected in the document structure window 800, a property editor 425 is launched. Alternately, the property editor can remain open whenever the document structure window 800 is open and respond to selections made in the document structure window. The property editor enables a user to provide values for selected properties in a style sheet. By selecting the property value in the property editor 425 a user can input values for the property.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for editing style properties of a document in a web portal, the method comprising:
   accepting a designation of the document;
   determining a plurality of style sheets capable of influencing a presentation of the document;
   presenting a first graphical view of the document, wherein the first graphical view can accept a selection of a location in the document;
   presenting a second graphical view of a hierarchical organization of the plurality of style sheets capable of influencing the presentation of the document, wherein the second graphical view can accept a selection of one or more of the plurality of style sheets, wherein the second graphical view changes based on the selection of a location in the document, and wherein the hierarchical organization of the plurality of style sheets indicates inheritance relationships amongst the plurality of style sheets; and
   presenting a third graphical view, wherein in response to the selection of one or more of the plurality of style sheets, a list of styles inherited by the one or more of the plurality of style sheets and style information for the one or more of the plurality of style sheets are presented in the third graphical view;
   wherein the first graphical view, the second graphical view, and the third graphical view are displayed at the same time.

2. The method of claim 1, wherein presenting the second graphical view of a hierarchical organization of the plurality of style sheets capable of influencing the presentation of the document comprises presenting a hierarchy of relevant style sheets.

3. The method of claim 1, wherein determining a plurality of style sheets capable of influencing a presentation of the document comprises determining Cascading Style Sheets (CSS) files that influence the presentation of the document.

4. The method of claim 1, wherein determining a plurality of style sheets capable of influencing a presentation of the document comprises checking a skin file.

5. The method of claim 1, wherein the style sheets include one or more font properties.

6. The method of claim 1, wherein the style sheets include one or more border properties.

7. The method of claim 1, wherein the style sheets include one or more color properties.

8. The method of claim 1, further comprising:
   accepting a selection of a style sheet from the organization of the plurality of style sheets; and
   opening an editor for the style sheet.

9. A machine readable medium having instructions stored thereon that when executed by a processor causes a system to:
   accept a designation of a document in a web portal;
   determine a plurality of style sheets capable of influencing a presentation of the document;
   present a first graphical view of the document wherein the first graphical view can accept a selection of a location in the document;
   present a second graphical view of a hierarchical organization of the plurality of style sheets capable of influencing the presentation of the document, wherein the second graphical view can accept a selection of one or more of the plurality of style sheets, wherein the second graphical view changes based on the selection of a location in the document, and wherein the hierarchical organization of the plurality of style sheets indicates inheritance relationships amongst the plurality of style sheets; and present a third graphical view, wherein in response to the selection of one or more of the plurality of style sheets, a list of styles inherited by the one or more of the plurality of style sheets and style information for the one or more of the plurality of style sheets are presented in the third graphical view;

wherein the first graphical view, the second graphical view, and the third graphical view are displayed at the same time.

10. The machine readable medium of claim 9, wherein the instructions that when executed by the processor cause the system to present the second graphical view of a hierarchical organization of the plurality of style sheets capable of influencing the presentation of the document comprise instructions that when executed by the processor cause the system to present a hierarchy of relevant style sheets.

11. The machine readable medium of claim 9, wherein the instructions that when executed by the processor cause the system to determine a plurality of style sheets capable of influencing a presentation of the document comprise instructions that when executed by the processor cause the system to determine Cascading Style Sheets (CSS) files that influence the presentation of the document.

12. The machine readable medium of claim 9, wherein the instructions that when executed by the processor cause the system to determine a plurality of style sheets capable of influencing a presentation of the document comprise instructions that when executed by the processor cause the system to check a skin file.

13. The machine readable medium of claim 9, wherein the style sheets include one or more font properties.

14. The machine readable medium of claim 9, wherein the style sheets include one or more border properties.

15. The machine readable medium of claim 9, wherein the style sheets include one or more color properties.

16. The machine readable medium of claim 9, further comprising instructions that when executed by the processor cause the system to:
   accept a selection of a style sheet from the organization of the plurality of style sheets; and
   open an editor for the style sheet.

17. A computer-based system for editing style properties of a document in a web portal, the system comprising:
   an interface module in memory configured to:
   accept a designation of a document in a web portal;
   determine a plurality of style sheets capable of influencing a presentation of the document;
   present a first graphical view of the document, wherein the first graphical view can accept a selection of a location in the document;
   present a second graphical view of a hierarchical organization of the plurality of style sheets capable of influencing the presentation of the document, wherein the second graphical view can accent a selection of one or more of the plurality of style sheets, wherein the second graphical view changes based on the selection of a location in the document, and wherein the hierarchical organization of the plurality of style sheets indicates inheritance relationships amongst the plurality of style sheets; and
   present a third graphical view, wherein in response to the selection of one or more of the plurality of style sheets, a list of styles inherited by the one or more of the plurality of style sheets and style information for the one or more of the plurality of style sheets are presented in the third graphical view;
   wherein the first graphical view, the second graphical view, and the third graphical view are displayed at the same time.

18. The system of claim 17, wherein the interface module, when presenting the second graphical view of a hierarchical organization of the plurality of style sheets capable of influencing the presentation of the document, is configured to cause the system to present a hierarchy of relevant style sheets.

19. The system of claim 17, wherein the interface module, when determining a plurality of style sheets capable of influencing a presentation of the document is configured to cause the system to determine Cascading Style Sheets (CSS) files that influence the presentation of the document.

20. The system of claim 17, wherein the interface module, when determining a plurality of style sheets capable of influencing a presentation of the document is further configured to check a skin file.

21. The system of claim 17, wherein the style sheets include one or more font properties.

22. The system of claim 17, wherein the style sheets include one or more border properties.

23. The system of claim 17, wherein the style sheets include one or more color properties.

24. The system of claim 17, wherein the interface module is further configured to:
   accept a selection of a style sheet from the organization of the plurality of style sheets; and
   open an editor for the style sheet.

* * * * *

UNITED STATES PATENT AND TRADEMARK OFFICE
CERTIFICATE OF CORRECTION

| | | |
|---|---|---|
| PATENT NO. | : 7,490,290 B2 | Page 1 of 1 |
| APPLICATION NO. | : 11/046351 | |
| DATED | : February 10, 2009 | |
| INVENTOR(S) | : White et al. | |

It is certified that error appears in the above-identified patent and that said Letters Patent is hereby corrected as shown below:

In column 10, line 9, in claim 17, delete "accent" and insert -- accept --, therefor.

Signed and Sealed this

Eighteenth Day of May, 2010

David J. Kappos
*Director of the United States Patent and Trademark Office*